(12) United States Patent
Nandikonda et al.

(10) Patent No.: US 6,314,111 B1
(45) Date of Patent: Nov. 6, 2001

(54) METHOD FOR TRANSMISSION OF ADDRESS DATA

(75) Inventors: Mahender Nandikonda, Bochum (DE); Harri Hakulinen, Tampere (FI)

(73) Assignee: Nokia Technology GmbH, Pforzheim (DE)

( * ) Notice: Subject to any disclaimer, the term of this patent is extended or adjusted under 35 U.S.C. 154(b) by 0 days.

(21) Appl. No.: 08/976,240

(22) Filed: Nov. 21, 1997

(30) Foreign Application Priority Data

Nov. 21, 1996 (FI) ........................................... 964640

(51) Int. Cl.[7] .................. H04J 3/24; H04H 1/04
(52) U.S. Cl. ................. 370/473; 370/486; 725/66; 725/71
(58) Field of Search ..................... 370/352–356, 370/392, 486, 487, 473, 471, 465, 475, 485; 348/10, 423, 385; 725/87, 92, 95, 98, 103, 63–66, 68, 70, 71

(56) References Cited

U.S. PATENT DOCUMENTS

| | | | |
|---|---|---|---|
| 5,043,605 | * | 8/1991 | Koepele, Jr. ............................. 348/10 |
| 5,774,170 | * | 6/1998 | Hite et al. ................................ 348/9 |
| 5,966,385 | * | 10/1999 | Fujii et al. .............................. 370/465 |
| 5,990,883 | * | 11/1999 | Byrne et al. ........................... 345/327 |
| 6,018,764 | * | 1/2000 | Field et al. ............................. 709/217 |
| 6,061,719 | * | 5/2000 | Bendinelli et al. ................... 709/218 |
| 6,073,122 | * | 6/2000 | Wool ...................................... 705/51 |

FOREIGN PATENT DOCUMENTS 0697793   2/1996  (EP) .

* cited by examiner

Primary Examiner—Chau Nguyen
Assistant Examiner—Soon-Dong Hyun
(74) Attorney, Agent, or Firm—Ware, Freesola, Van Der Sluys & Adolphson LLP

(57) ABSTRACT

A method for finding out address information of a data source in a data transmission system comprises at least one data transmission stream (TS) for transmitting information on at least one data source preferably in packet form, wherein the packets contain information on which data source they belong to. Further, the method comprises one or more data transmission channels, in which the data transmission streams are conveyed, as well as a name server system for storage of address information of data sources, the address information containing an identification of the data source, such as the title, and information on the data transmission channel to be used for transmission of the data source, and a data receiving device (19). A data transmission connection is formed from the data receiving device (19) to the name server system (22a, 22b, 22c), and the identification of the desired data source is sent in the first form to the name server system (22a, 22b, 22c). In the name server system (22a, 22b, 22c), the identification of the data source is compared with the identification of the data source to be searched for, wherein when the identification of the data source searched for is found in the address information, the address is converted to a second form to advantageously comprise information on the transmission channel to be used for data transmission of the data source, and the address is returned in the second form to the date receiving device (19).

17 Claims, 11 Drawing Sheets

METHOD FOR TRANSMISSION OF ADDRESS DATA

TECHNICAL FIELD

The present invention relates to the methods for finding out address information of a data source in a data transmission system as well as to the data transmission systems.

BACKGROUND OF THE INVENTION

For transmission of digital video, audio and data signals, it is possible to use either a landline transmission via an antenna in the air, a satellite connection, a cable TV network, a telephone or telecommunication network, or a light cable network, through which digital information is transmitted to a large number of receivers. An advantage of the transmission of digital signals over analog transmission is the fact that the same transmission channel can be used for the transmission of signals from several different program sources. This can be implemented for example in a way that the signals are divided by a method known as such to packets which are transmitted on the transmission channel. Packets formed of different program sources are broadcast in a time-interlaced manner, wherein a packet comprises advantageously at name field bearing information on which program source said packet belongs to, and a data field having the information to be broadcast.

Before analog signals can be broadcast in packet form, the analog signals must first be converted to digital signals at the sending end, wherein the digital signal formed can be arranged in packets to be sent to the transmission channel. At the receiving end, the analog signals converted to digital signals are converted back to analog form.

One important application of transmission of digital signals in packet form is the digital television system, in which several programs are transmitted simultaneously in one broadcasting channel. Thus the broadcasting channel carries packets containing video, audio and data information of different programs in turns. One example is the MPEG-2 (Motion Picture Experts Group) which defines the packeting of information as well as a generic standard for the video and audio compression method, making it possible to broadcast a television image with fewer bits than by digitizing the television image directly to bits. One video data packet usually covers image information from several macroblocks containing 16×16 pixels. FIG. 1 shows a data transmission system, in which video, audio and data signals formed by different program sources are transmitted in the channel to the receiver. At the broadcasting end, packets are formed from different types of information, such as video, audio and data, which are integrated into program packets, for example by a multiplexer 2. Further information on the program, such as service information (SI) identifying the program, is added to the program packets in a second multiplexer 3. FIG. 1 shows the packet-stream forming devices 1a, 1b, 1c, 2, 3 for only one program, but at the transmitting end, several different programs can be combined to the same data transmission stream. The system of FIG. 1 contains a program multiplexer 4 for integrating packets from different program sources advantageously to a data transmission stream in packet form for broadcasting further. Upon broadcasting, it is still possible to encrypt all or some packets using an encryption device 5, after which the data transmission stream is channel-coded with a channel-coder 6. The channel-coder 6 converts the data transmission stream to a signal which is suitable for the data transmission channel used at the time, as is known. The data transmission channel 7 is for example a satellite connection, a cable connection or a landline link connection.

At the receiving end, the converse operations are performed in relation to the sending, i.e. channel decoding, deciphering, separation of Si information, and demultiplexing of program packets, wherein the packets belonging to a program to be watched Eat a time are separated as one signal from the data transmission stream, where in the video packets, audio packets and data packets are separated from the signal of the program to be received.

For watching digital video signals, receiving devices have been developed, namely so-called Set-Top-Box (STB) devices. In these STB devices, the received digital video signal is demodulated and error-correction is conducted for elimination of possible errors that have interfered the signal on the transmission channel. Further, from the stream of packets, those packets are selected which belong to the program that is intended to be watched, and possible encryption is deciphered, provided that the viewer has the right for encryption deciphering. After this, the deciphered signal is decoded, that is, the reverse operation is performed in relation to the coding at the transmission stage, for example coding according to the MPEG-2 algorithm. Decoding is conducted on both audio and video signals, wherein the decoder advantageously makes both an audio and a video signal. The decoded signals are at this stage still in digital form, the audio signal is still directed to the digital-to-analog converter and the video signal is directed e.g. to a PAL converter or a NTSC converter according to the system used for transmitting the color information of the video image. The above-mentioned PAL and NTSC color systems are the most common ones, but also other color coding systems are known. The block chart of FIG. 1 is a reduced illustration of the operational blocks of a STB device: the channel coder 8, the encryption deciphering means 9, a demultiplexer 10 for separation of service information from the packets, a demultiplexer 11 for program packets, as well as means 12a, 12b, 12c for separation of program packets and formation of video, audio and data signals corresponding to the broadcast signals. Further, the STB device can include means for storing service information.

The audio and video signals generated by the STB device are conveyed to a conventional television set, particularly to the video or SCART connection of the television, wherein the received information can be watched on the television screen.

At the transmission end of digital television systems, the transmission servers form digital packets of several programs to be broadcast, and these packets are transmitted to the transmission channel, such as a satellite 16a, 16b (FIG. 1b). The programs to be broadcast may include for example commercial videos, music videos, movies, sports events, current affairs programs, and news. The STB device is capable of selecting from the incoming data transmission stream the program that the viewer wishes to watch. Thus the viewer must give the device the identification of the program in question, or the STB device can make a list of the identifications of those programs that are included in the data transmission stream to be received, for example in the signal from the satellite to which a receiving antenna 21 is directed.

FIG. 2a shows an example of giving the title of a program in text form. The first field shows the identification of the protocol to be used, such as digital video broadcasting (DVB) or hypertext transfer protocol (HTTP). The protocol identifier is followed by a protocol separator, with which the protocol field is separated from the next field. The next field is a service name field, which is again followed by a field separator. The third field is the service provider name field, which is separated by a field separator from the fourth field, i.e. the network name field. The network name field is finally followed by a name separator.

One advantage of the above-mentioned naming practice is that when the physical properties of the transmission network are changed, for example the broadcasting frequency or the location of a satellite is changed, this change will have no effect on the user. On the other hand, the STB device will also require knowledge on where the said program broadcasting can be received, wherein the STB device must also be transmitted the physical parameters of the broadcasting. FIG. 2b is an exemplified illustration on the presentation of one text-form service information item in numerical form, also including information on the physical parameters. In case the viewer would like to watch this program, he or she should enter the numerical data to the STB device, or this data should be stored using another known method. This involves the disadvantage that any changes in the physical parameters should be updated to the STB device. Such numerical strings are difficult to remember, and their input will easily involve writing errors which are not even necessarily noticed, in which case it is not possible to watch the desired program.

STB devices are known which have browsing properties, wherein the STB device forms advantageously a list to be displayed of the programs which are transmitted in the data transmission stream received by the STB device at a time. The viewer can then select from the list the program he or she wishes to watch. However, this system involves the disadvantage that the list of programs is limited to the programs in the data transmission stream received at the time. The viewer may still have access to the address data of a program which is broadcast via another data transmission stream, maybe via a different type of data transmission channel. Thus the viewer must also enter into the STB device also the parameters of the data transmission channel which are not necessarily known to the viewer.

SUMMARY OF THE INVENTION

The aim of the present invention is to provide a method in which the identification data of a program intended to be received can be acquired on the basis of information in the first form, such as title information in text form, wherein the system produces the information in the second form corresponding to that in the first form. The first advantageous embodiment of the method is a method for finding out address information of a data source in a data transmission system comprising: at least one data transmission stream for transmitting information on at least one data source preferably in packet form, wherein the packets contain information on which data source they belong to; one or more data transmission channels, in which the data transmission streams are conveyed; a name server system for storage of address information of data sources, the address information containing an identification of the data source, such as the title, and information on the data transmission channel to be used for transmission of the data source; and a data receiving device, wherein a data transmission connection is formed from the data receiving device to the name server system, and the identification of the desired data source is sent in the first form to the name server system, in which the identification of the data source is compared with the identification of the data source to be searched for, wherein when the identification of the data source searched for is found in the address information, the address is converted to a second form to advantageously comprise information on the transmission channel to be used for data transmission of the data source, and the address is returned in the second form to the data receiving device. The second advantageous embodiment of the method is a method for finding out address information of a data source in a data transmission system comprising: at least one data transmission stream for transmitting information on at least one data source preferably in packet form, wherein the packets contain information on which data source they belong to; one or more data transmission channels, in which the data transmission streams are conveyed; and a data receiving device; which method is used for transmitting in at least one data transmission stream the address information in the first form of at least one data source belonging to the data transmission system, the information comprising the identification of the data source, such as the title, and information on the data transmission channel to be used for data transmission of the data source; wherein for at least one data transmission stream received by the data receiving device, a comparison is made between the identification of the data source and the identification of the data source to be searched for, wherein when the identification of the data source searched for is found in the address information, the address is converted to a second form to advantageously comprise information on the transmission channel to be used for data transmission of the data source. The third advantageous embodiment of the method according to the present invention is a method as stated above, wherein the search for the address information is conducted in stages, wherein: at the first stage, a data transmission connection is formed from the data receiving device to the name server system and the identification of the given data source is sent to the name server system, the identification of the data source is compared in the name server system with the identification of the data source to be searched for, wherein when the identification of the data source searched for is found in the address information, the address is converted to a second form to advantageously comprise information on the transmission channel to be used for data transmission of the data source, and the address is returned in the second form to the data receiving device; and if the address information searched for was not found at the first stage, the second stage is conducted, at which in at least one data transmission stream received by the data receiving device, a comparison is made between the identification of the data source and the identification of the data source to be searched for, wherein when the identification of the data source searched for is found in the address information, the address is converted to a second form to advantageously comprise information on the transmission channel to be used for data transmission of the data source. The fourth advantageous embodiment of the method according to the present invention is a method as stated above, wherein the search for the address information is conducted in stages, wherein: at the first stage, in at least one data transmission stream received by the data receiving device, a comparison is made between the identification of the data source and the identification of the data source to be searched for, wherein when the identification of the data source searched for is found in the address information, the address is converted to a second form to advantageously comprise information on the transmission channel to be used for data transmission of the data source; and if the address information searched for was not found at the first stage, the second stage is conducted, at which a data transmission connection is formed from the data receiving device to the name server system and the identification of the given data source is sent to the name server system, the identification of the data source is compared in the name server system with the identification of the data source to be searched for, wherein when the identification of the data source searched for is found in the address information, the address is converted to a second form to advantageously comprise information on the transmission channel to be used for data transmission of the data source, and the address is returned in the second form to the data receiving device. The first advantageous embodiment of the system according to the present invention is a data transmission system comprising: means for forming at least one data transmission stream for transmitting information on at least one data source preferably in packet form, wherein the packets incorporate information on which data sources they belong to; one or several data transmission channels in which data transmission streams are arranged to be carried; a name server system comprising at least one name server, in which address information of data sources is stored, the address information comprising the identification of the data source, such as the title, and information on the data transmission channel to be used for transmission of the data source; and a data receiving device; wherein a data transmission connection is arranged to be formed from the data receiving device to the name server system for sending the identification of a desired data source in the first form to the name server system, in which the identification of the data source is arranged to be compared with the identification of the data source to be searched for, wherein when the identification of the data source searched for is found in the address information, the address is converted to a second form to advantageously comprise information on the transmission channel to be used for data transmission of the data source, and the address is arranged to be returned in the second form to the data receiving device. The second advantageous embodiment of the system according to the present invention is a data transmission system comprising: means for forming at least one data transmission stream for transmitting information on at least one data source preferably in packet form, wherein the packets are arranged to incorporate information on which data source they belong to; one or several data transmission channels, in which data transmission streams are arranged to be carried; a name server system comprising at least one name server, in which address information of data sources is stored, the address information comprising the identification of the data source, such as the title, and information on the data transmission channel to be used for transmission of the data source; and a data receiving device, in which system the address information of at least one data source belonging to the data transmission system is arranged to be transmitted in at least one data transmission stream in the first form, the address information comprising the identification of the data source, such as the title, and information on the data transmission channel to be used for transmission of the data source; wherein the system comprises means for comparing the identification of the data source with the identification of the data source in at least one data transmission stream received, wherein when the identification of the data source to be searched for is found in the address information, the address is arranged to be converted to the second form on the basis of the address information corresponding to the identification, the address advantageously comprising information on the data transmission channel to be used for transmission of the data source. The invention is based on the idea that the information presented in the first form is utilized to find out the information corresponding to that given in the first form but presented in the second form.

The detection can be conducted by transmitting the information given in the first form to a name server, in which for each program the information corresponding to the information in the first form is stored in the second form, and this information is provided by the name server.

The detection can also be conducted advantageously by searching for the information in the first form from the service information joined to the data transmission stream and containing the identification data of the programs to be broadcast in the data transmission stream, such as the title and physical parameters of the transmission channel. In case the information of the searched program is found, the information in the second form can be produced on the basis of the parameters connected to this information.

It is also possible to combine the above-mentioned embodiments either by first searching the service information of the data transmission stream and, if the desired identification is not found, to consult the name server system, or in a way that the name server system is first consulted and, if the desired identification is not found, the service information of the data transmission stream is studied.

On the basis of the information in the second form, the STB device selects the transmission channel corresponding to the selected program and separates the packets of the selected program from the data transmission packets of the transmission channel.

Advantageously at least part of the service information received from the data transmission stream is stored in the STB device.

The present invention gives remarkable advantages to the methods of prior art. The viewer does not need to know which physical transmission channel is utilized for transmission of the desired program, wherein program selection is easy.

BRIEF DESCRIPTION OF THE DRAWINGS

In the following, the invention will be described in more detail with reference to the appended drawings. In the drawings.

BEST MODE FOR CARRYING OUT THE INVENTION

Figure 1A:
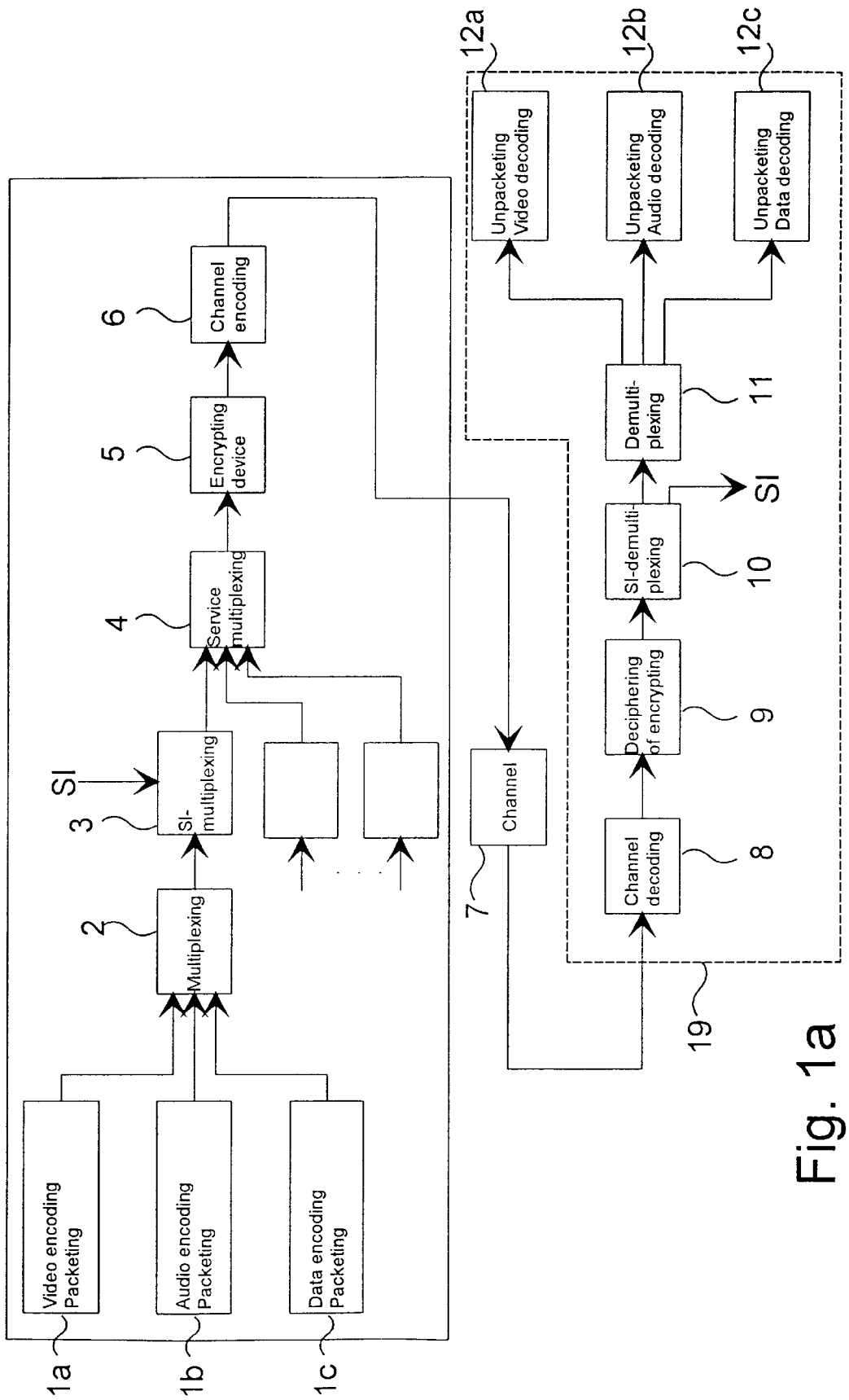
FIG. 1a is a block diagram showing a data communication system for providing information on program sources from the transmitter to the receiver.
Figure 1B:
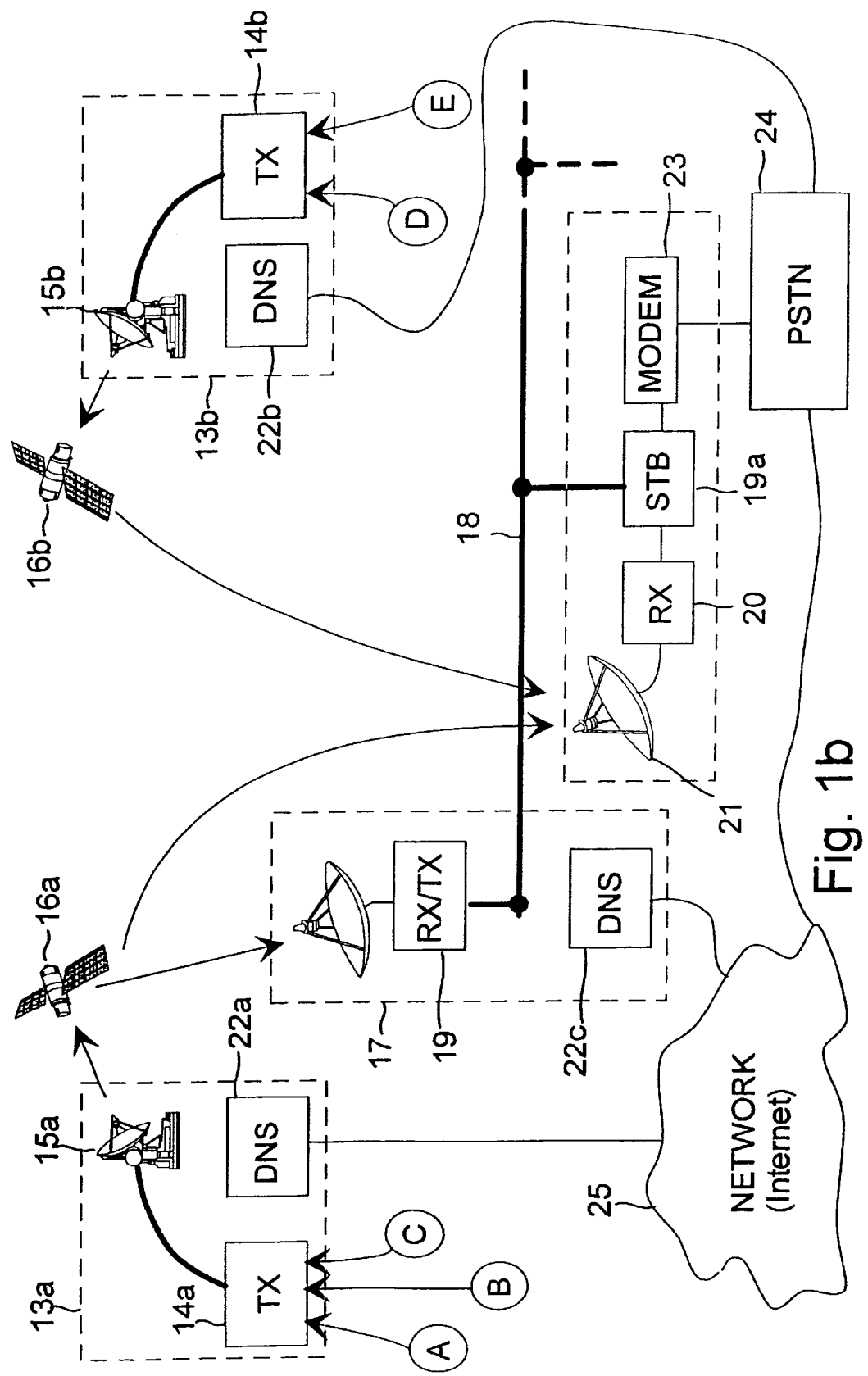
FIG. 1b is a reduced diagram showing a data communication system.

The appended FIG. 1b shows a data communication system in which the present invention can be advantageously applied. Program services providers A, B, C, D, E each send their own program to a broadcasting station 13a, 13b of a provider of broadcasting services. The broadcasting station 13a, 13b comprises e.g. a program server 14a, 14b and means 15a, 15b for broadcasting the data transmission stream to the transmission channel. In the program server 14a, 14b), each program (data source) to be broadcast is converted into packets which are advantageously multiplexed to one data transmission stream (TS). The data transmission stream is sent from the transmitter antenna 15a, 15b for example to a satellite 16a, 16b. The satellite 16a, 16b transmits the data transmission stream to a ground station 17, which is e.g. the satellite receiver 19 of the operator of a cable television network 18. The data transmission stream is transmitted from the ground station 17 to the cable television network 18, which incorporates STB devices 19a of the viewers for selecting the desired programs to be watched from the data transmission stream. The program transmitted via the satellite 16a, 16b can also be watched directly, wherein the STB device 19a is connected to a satellite receiver 20 in which the signal received by the satellite antenna 21 is converted to a form suitable for the STB device. The satellite receiver 20 can possibly be adjusted to receive data transmission streams also transmitted by other satellites, such as the second satellite 16b in FIG. 1b. The satellites 16a, 16b can belong to the same program server, or they can be satellites of different program servers 14a, 14b.

The STB device of the viewer is advantageously set for a defined default data transmission stream which the STB3 device starts to receive when the STB device is turned on. For receiving other data transmission streams, the STB device must be adjusted to the signal transmitted by the desired data transmission stream; for example, the receiving antenna 21 must be directed to a different satellite and tuned to the channel frequency in which the data transmission stream is broadcast. The transmission channel can also be the signal of the cable television network 18, wherein the STB device is adjusted to receive signals from the cable. The practical implementation of data transmission in different types of data transmission channels (satellite, cable or link connection) is prior art as such, so it does not need to be presented in this context.

The data transmission stream (TS) can comprise packet-coded data packets of one or several programs, as presented above in this description. The data packets are e.g. program packets or packets containing information on other data transmission streams and program services contained in them to be transmitted via the video server in question. The design of the structure of the data transmission stream makes it possible to subject the data transmission stream to a large number of different operations in a way that their implementation does not require much capacity. The information on the program to be broadcast in the data transmission stream TS, i.e. program specific information (PSI), is placed in the data transmission stream before the broadcasting, wherein the decoder of the STB device 19a is capable of separating the transmission packets of the program in question from the data transmission stream and to decode the transmitted information. In case the structure of the data transmission stream is designed to be flexible, it is thus possible to broadcast different types of information, such as hypertext mark up language (HTML), news, etc. at a high speed, when the information to be transmitted is converted into packets. Interactive applications, such as Internet browsers, must give access to the information in the application by means of general/symbolic addressing methods, such as the method used by the uniform resource locator (URL) link in the WWW service that is used in Internet networks. In this description, an open application programmers interface (API) link is used, applying the digital video broadcasting (DVB) protocol for detecting the application-specific link, wherein the (correct information can be detected from the data transmission stream TS.

One method for entering the content of the data transmission stream is to use a general numerical addressing method. The link structure should be as general as possible, and it preferably supports a numerical addressing (Internet protocol, IP) and a domain name service (DNS) type addressing. One known numerical addressing method is used in the Internet data network.

Thanks to the fact that open data systems have rapidly become general, the Transmission Control Protocol/Internet Protocol (TCP/IP) connection practice has become a generally used protocol for computers of different sizes and brands to communicate. The TCP/IP support is now available for almost all operating systems. The TCP/IP network layer protocol, or Internet protocol IP, is intended for routing by gateways or routers. The routing is made by using four-byte IP addresses and routing tables. Thanks to the Internet Protocol, computers using the TCP/IP can transmit messages in the router network as far as to the other side of the globe.

The Internet, covering well particularly the industrialized countries, is a huge router network using the TCP/IP connection practice. At present, the Internet connects more than 1.5 million terminals and 20 million people. The largest group of users of the Internet, which was started only for scientific use, consists of companies which buy their services from commercial connection providers. In the Internet, each terminal has its own identifying IP address. The IP address is a 32-bit or four-byte figure which is divided by two into the organization-specific network address and the network-specific terminal address. For facilitating the processing of addresses, a decimal, so-called point notation system has been introduced, in which the addresses are given in 8-bit figures (octets) separated by points. One octet is a figure from 0 to 255. This address mechanism is further divided into three different classes (ABC) which make it possible to use network and terminal addresses of different lengths.

The increase in the popularity of the Internet has also had the result that the length of address fields in the data packets of Internet messages is no longer sufficient for expressing all the available addresses in all situations. For this reason, a new Internet protocol version IPv6- was developed, in which the length of the address fields was increased to 128 bits, which in practice means that all terminals to be incorporated in the Internet network can be reserved an individual address. The fields of the data packets of Internet messages are presented in FIG. 2c.

The title field comprises the following sections:

| | |
|---|---|
| Version | the 4-bit IP version (= 6), |
| Prio. | the 4-bit priority, |
| Flow label | the 24-bit identifier for identifying the connection on the application level, |
| Payload length | the 16-bit integer giving the length of the payload, i.e. the packet following the title, in bytes, |
| Next header | the 8-bit information defining the title immediately following the IPv6 title, |

-continued

| | |
|---|---|
| Top limit | the 8-bit integer counter which is reduced by one for each node that sends the packet forward; the packet is abandoned if the value is reduced to zero, |
| Source address | the 128-bit address of the transmitter of the original packet, |
| Destination address | the 128-bit address of the intended recipient. |

The title field is followed by the payload field, or the actual information to be transmitted.

Figure 3:
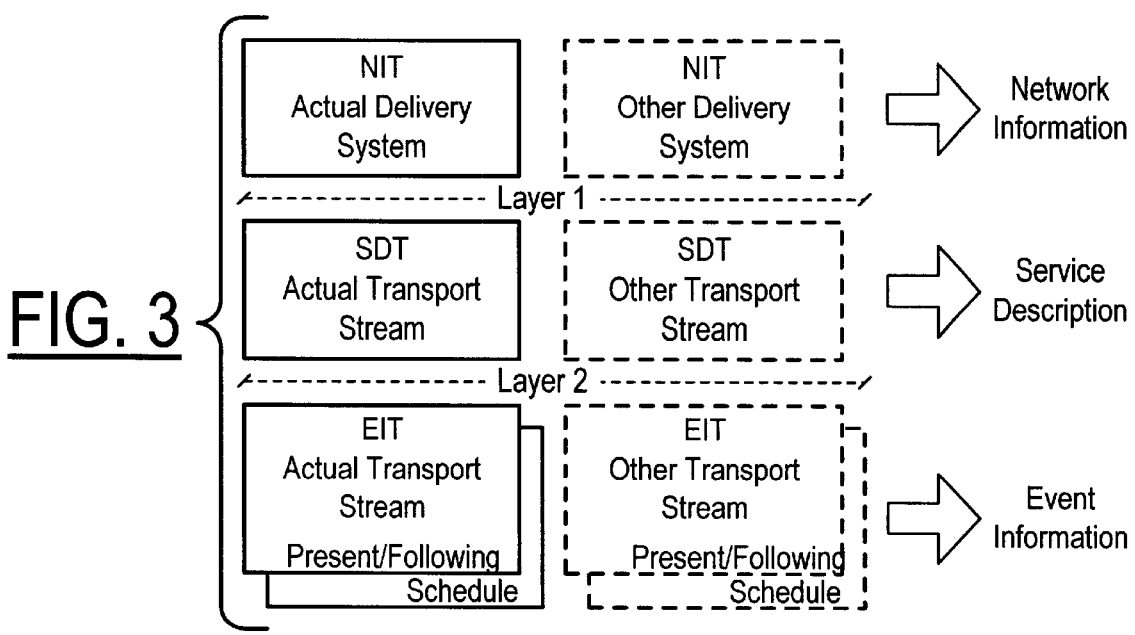
FIG. 3 illustrates a general hierarchy of service information.
Figure 4:
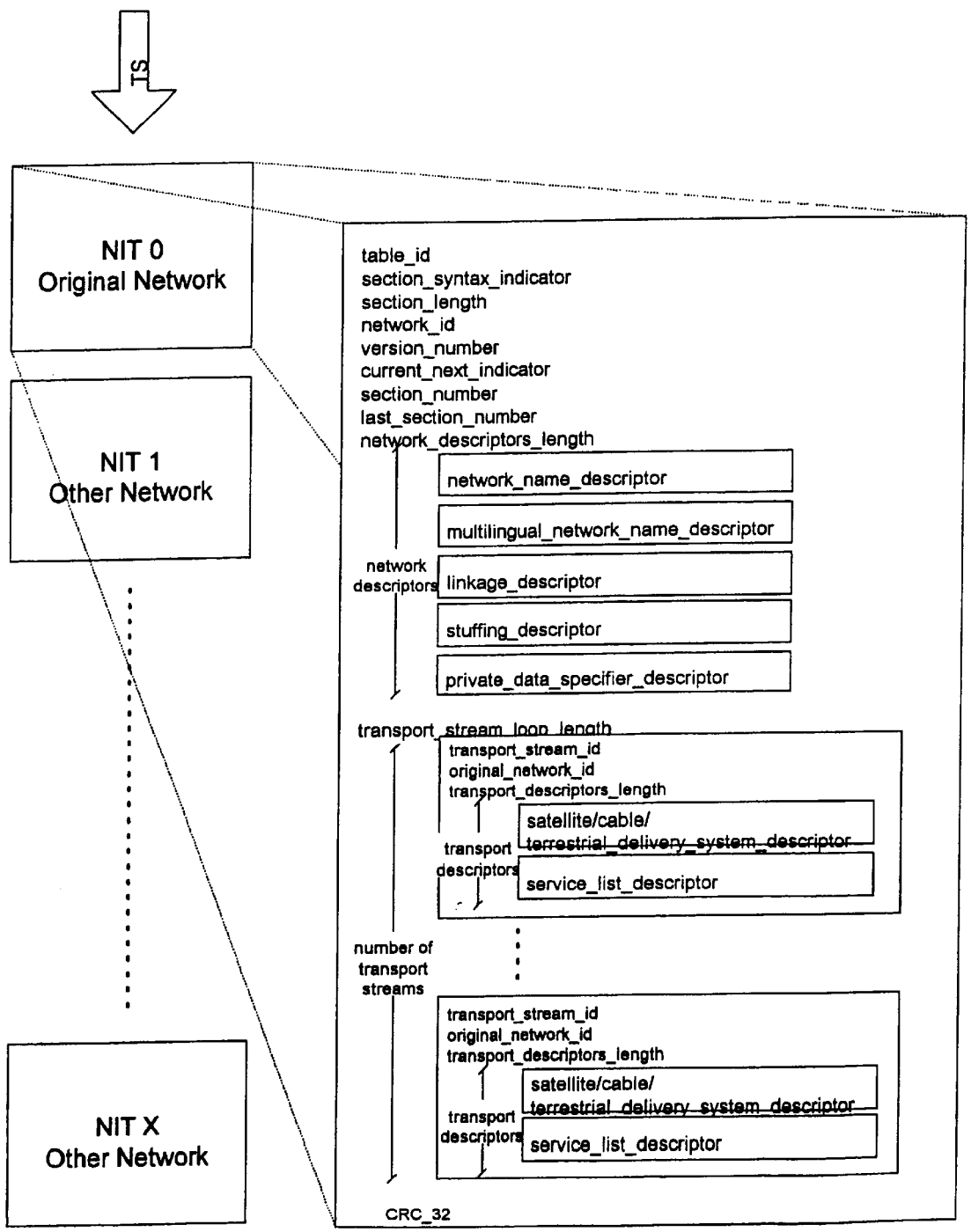
FIG. 4 illustrates the structure of a network information table.

FIG. 3 shows the general arrangement of the source information and its table hierarchy. The data is presented in layers, wherein the first layer shows information on the network, the second layer contains service descriptions, and the third layer contains information on events. The network may comprise for example the program servers 14a, 14b of a certain provider of program services. The program services provider has advantageously at least one domain name server (DNS) 22a, 22b, 22c in which information on data transmission streams to be transmitted and data sources is stored. The stored data include the identification of the data source, such as the name, and information on the data transmission channel to be used in data transmission of the data source. Thus the identification of the data source can be used for detecting the parameters of the data transmission channel and the data transmission stream by data transmission of the data source. If necessary, a data transmission connection between the domain name servers 22a, 22b, 22c can be formed e.g. via a data network 25. The network 25 can be even world-wide. FIG. 4 shows an example of the structure of a network information table NIT of the first layer. The network information table contains information on the physical arrangement of data transmission channels or data transmission streams in the given network as well as information on the properties of the network. The network information table NIT comprises several descriptors containing information needed for detecting a name.

Figure 5:
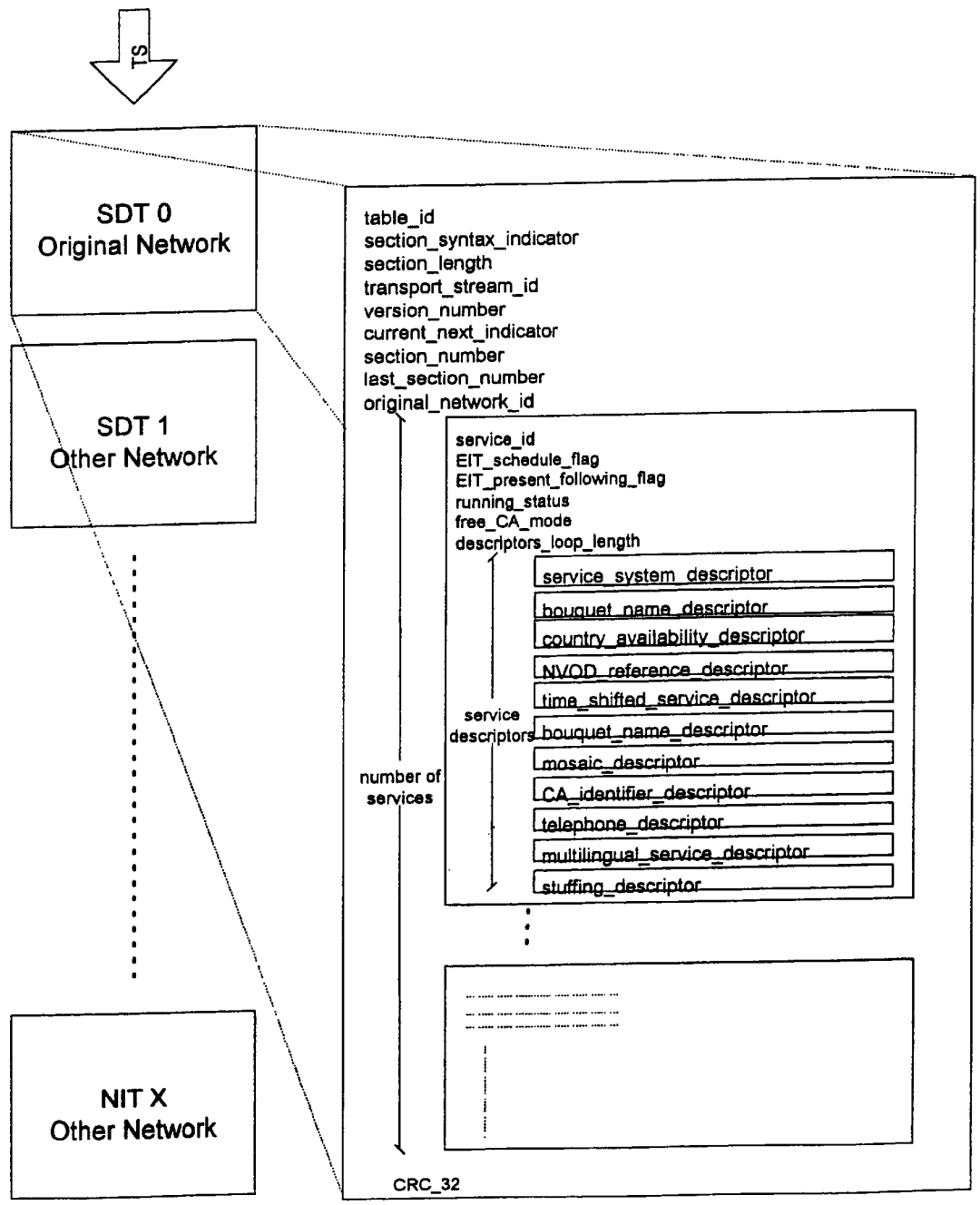
FIG. 5 illustrates the structure of a service description table.

FIG. 5 shows a service description table SDT. Service description tables show the services available in each data transmission stream. Service description tables are network-specific, wherein each network has its own service description table SDT0, SDT1, . . . , SDTX.

Figure 6:
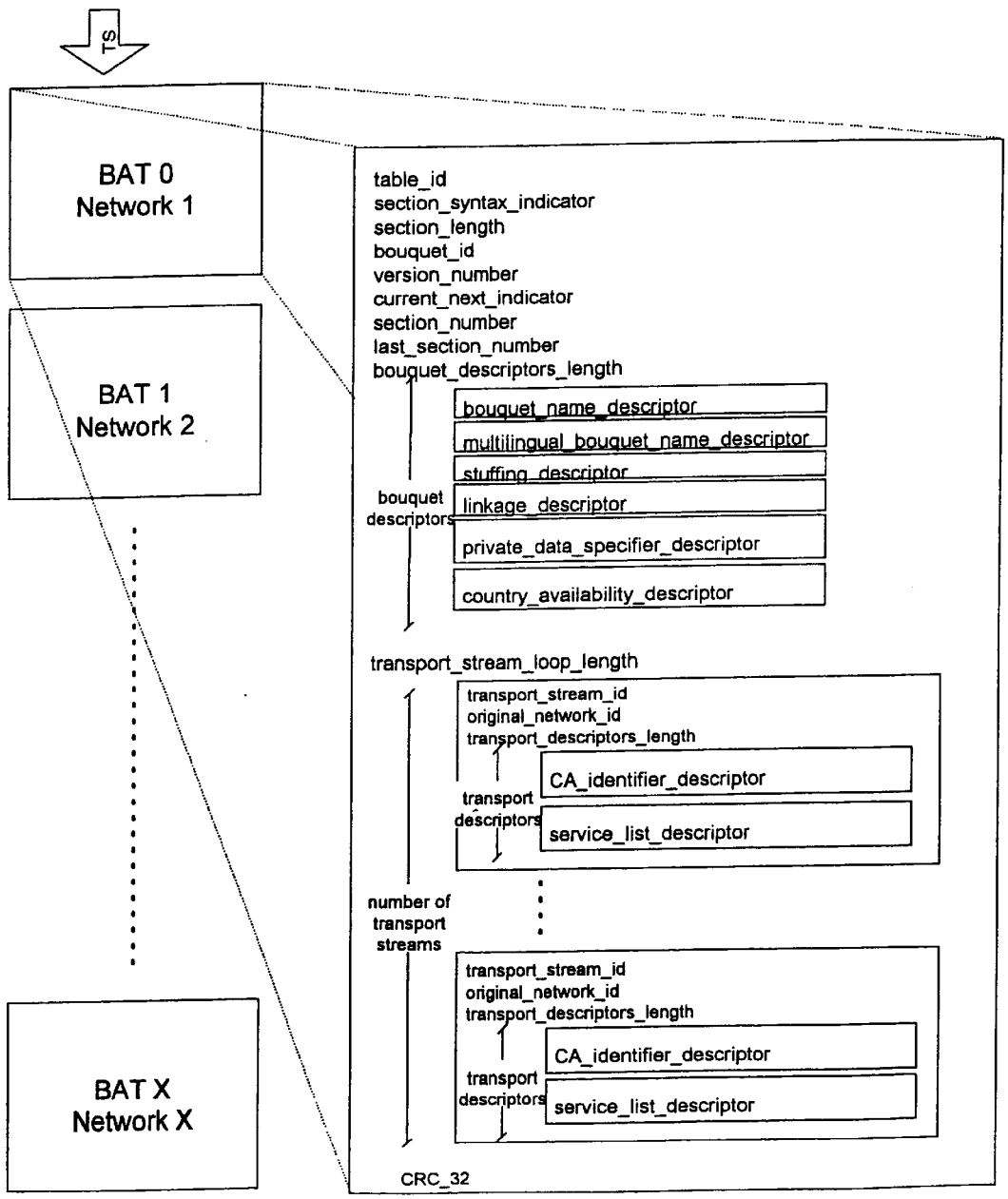
FIG. 6 illustrates the structure of a BAT table.

FIG. 6 shows the structure of a bouquet association table BAT. A bouquet association table shows information related to the services of the network.

Figure 7:
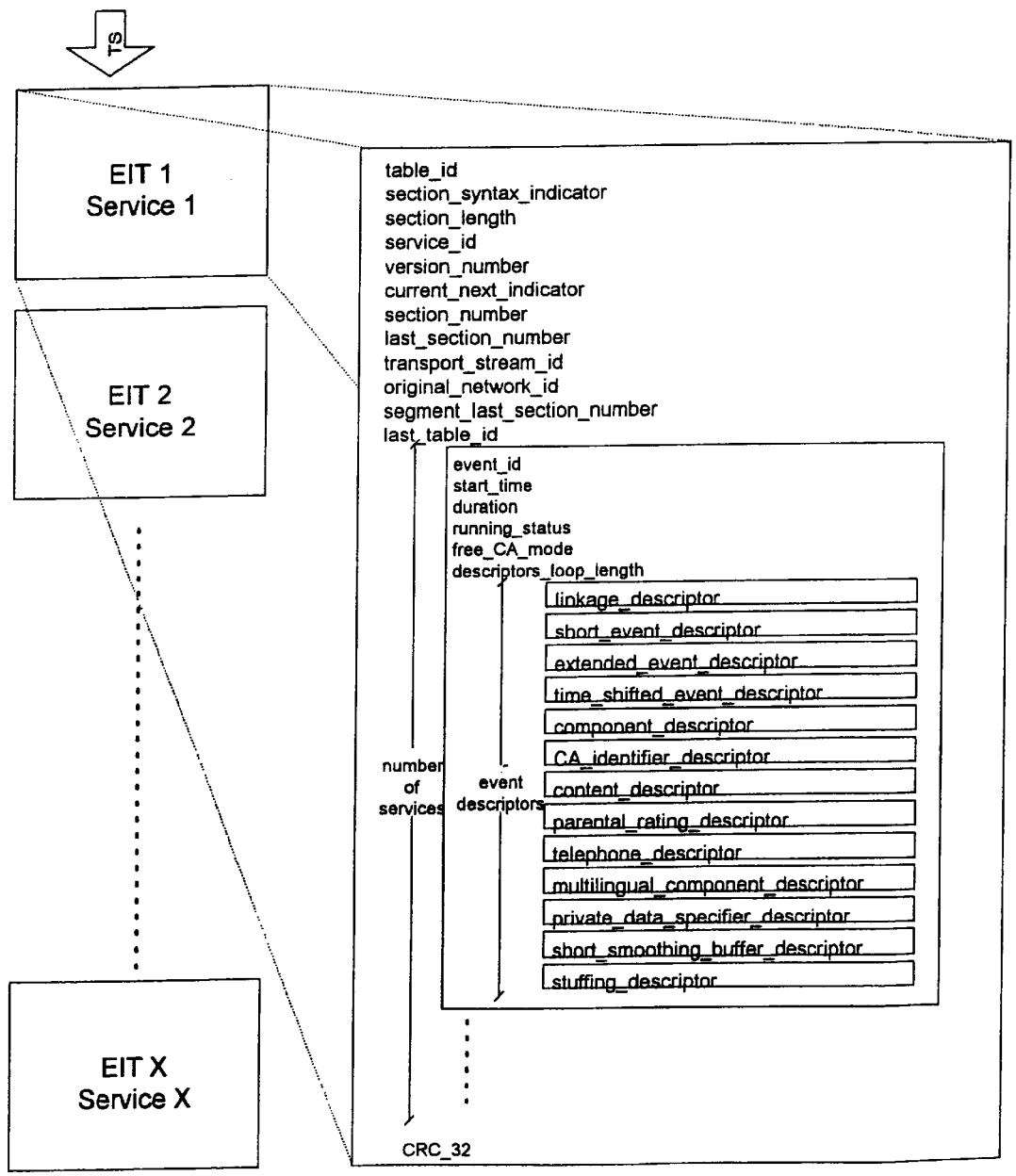
FIG. 7 illustrates the structure of an event information table.

FIG. 7 shows the structure of an event information table EIT. An event information table shows information related to events contained in each service in chronological order.

The above-mentioned tables are primarily given only as examples of how to arrange information related to data sources and data transmission channels and how to make references between different tables. The present invention can be advantageously applied also in using different types of information structures, where the identification of a data source is presented in a way that on the basis of the search information in the first form, it is possible to search the table structure for information to locate the data transmission stream of the data source, e.g. the physical parameters of a satellite channel or cable channel used for broadcasting of the data transmission stream.

Finding information from the data networks is based on the fact that there is a common agreement on the naming practice, i.e. the way of forming the address of the information to be transmitted via the data transmission channel. On the other hand, this naming practice makes limits to how a provider of information formulates the address for the information supplied. The Internet network is a network of this kind, in which a large number of different programs has been developed for finding information, such as WWW browsers. Also for broadcasting of digital information signals, naming instructions have been formulated, which in this description are called the DVB naming practice. However, the present invention is not limited solely to this naming practice, but it is used in this context primarily as an example. The term digital information signals refers in this context to video, audio and data signals.

Figure 8:
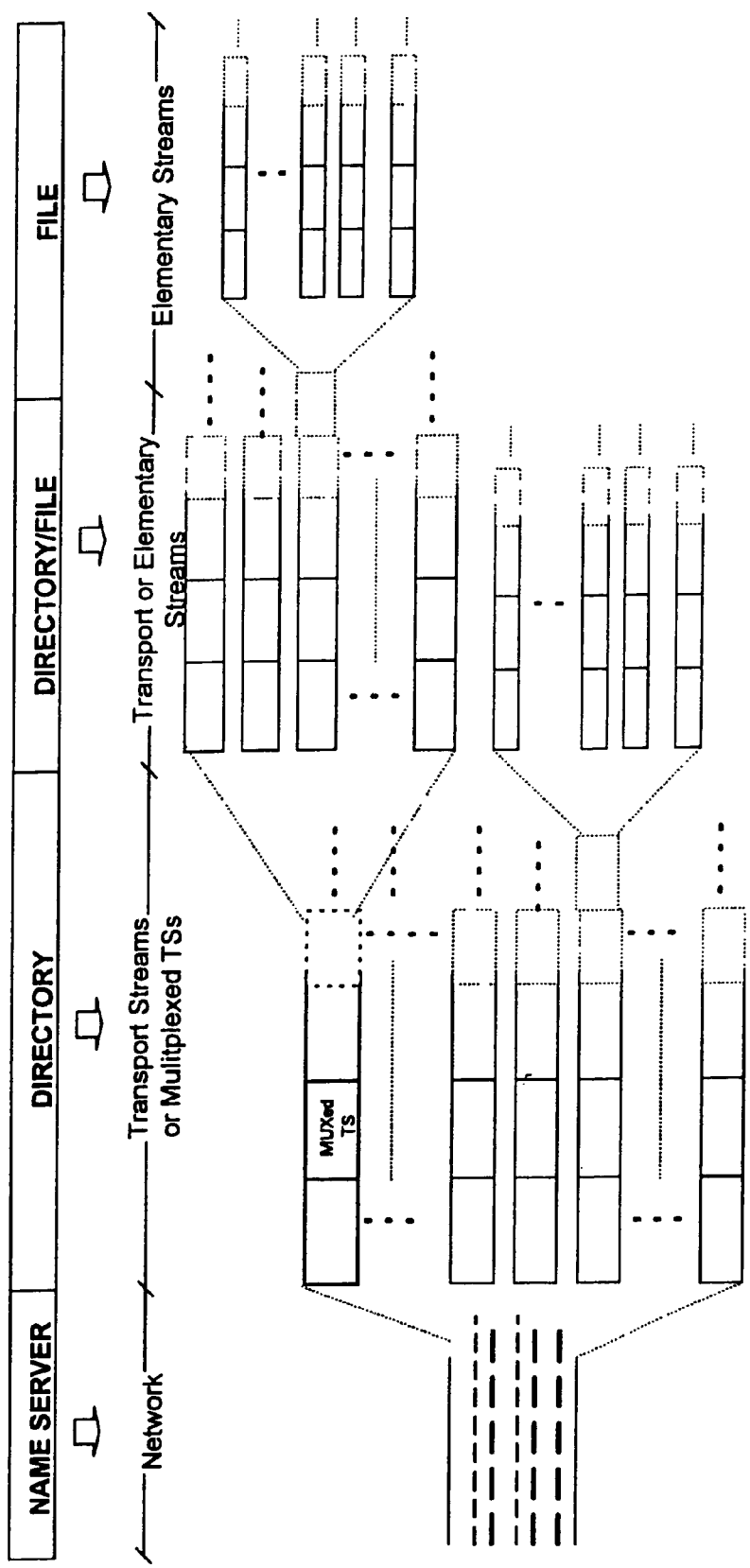
FIG. 8 illustrates a hierarchy of information to be transmitted in a data transmission network.

The DVB naming practice is used for identification of data sources (entities) in each data transmission network by using the service information contained in the MPEG data transmission stream TS. In this context, it is assumed that the viewer has adjusted his or her STB device to show any data source in the default data transmission stream at the stage of starting an application, such as a WWW browser. The parameters related to the data network with the default value are stored for example in a non-volatile random-access memory NVRAM in the STB device, or the user can enter them e.g. via a keyboard. A link denotes in this context a two-part address, with the first part identifying the data network, such as a name server, and the second part identifying the location of the data source in said network, such as an index, a directory, and the file structure. FIG. 8 exemplifies the connection between the second part of the link and the hierarchy of the data transmission streams. The naming practice to be disclosed below is intended for use in the device of the subscriber (viewer), such as an STB device, wherein identification of the data source is made with help of the service information available in the default value network.

A data source with a default value, to which the STB device is adjusted, is assumed to also contain the service information of other data sources in the network. Name resolution can only be made for those data sources, of which information is available via the data source with the default value. Information on data sources contained in other networks can be found out by detecting the physical parameters of the data source by using the method of the invention, as will be presented below in the description.

Figure 2A:
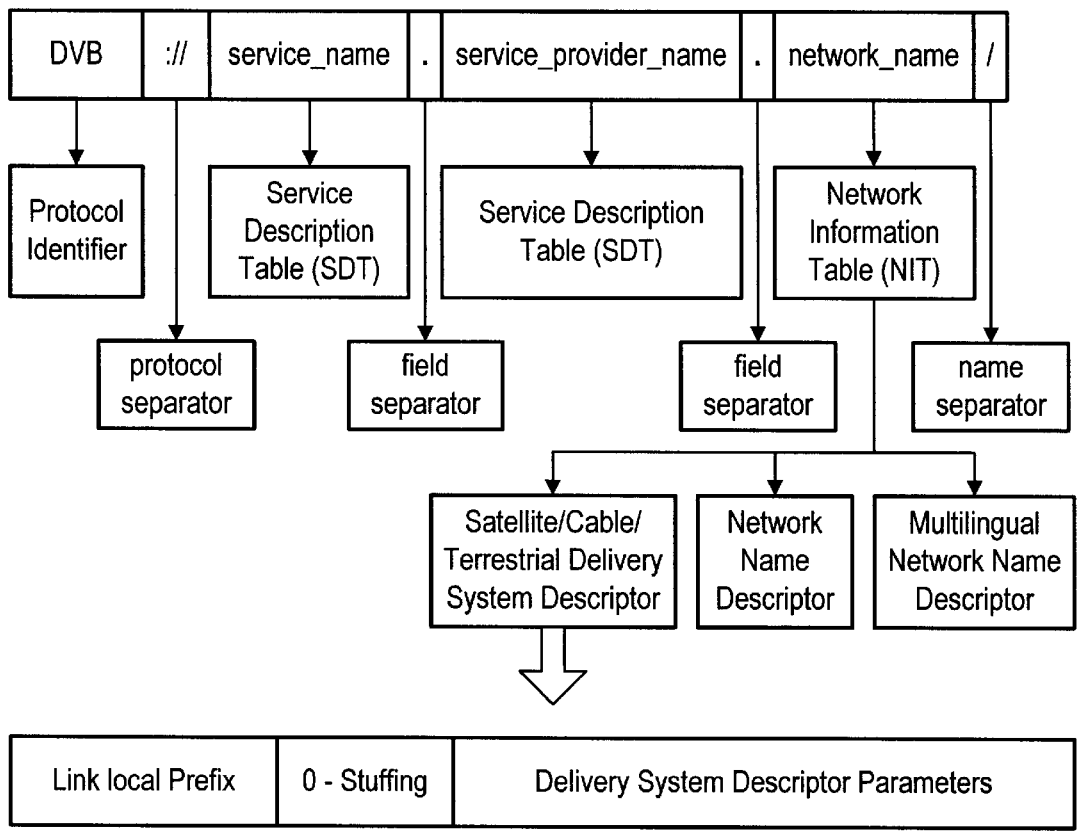
FIG. 2a shows a practice of naming program services.
Figure 2B:
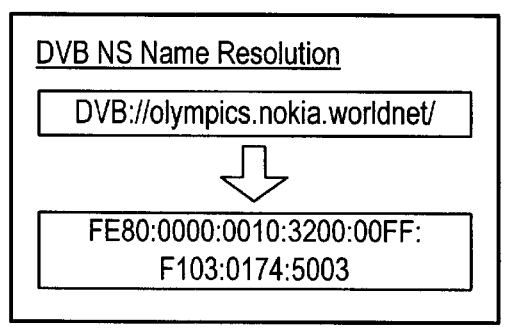
FIG. 2b shows the name of a program service in the first and second form.
Figure 2C:
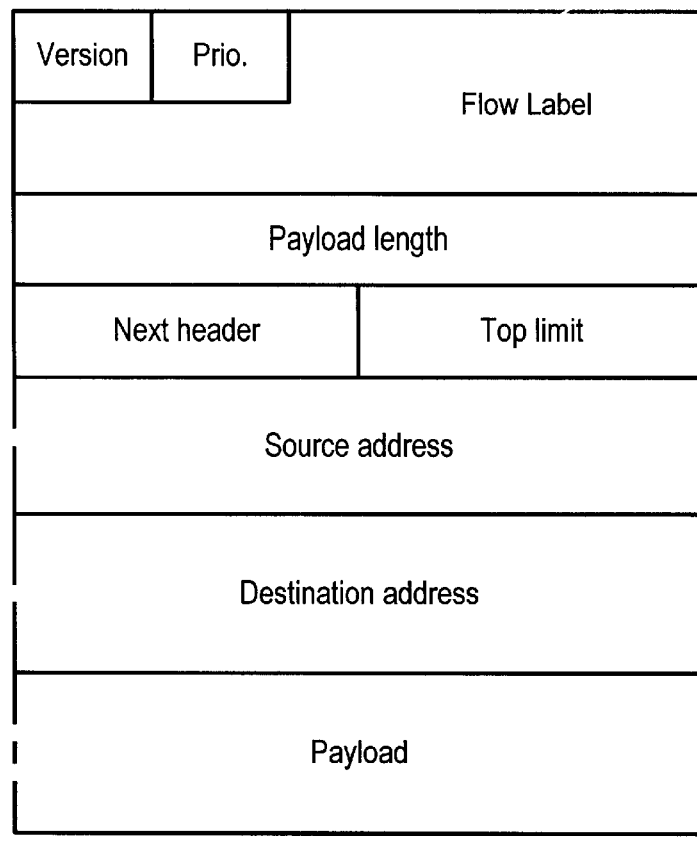
FIG. 2c shows the structure of a data packet in Internet version IPv6.

The first part of the link defines the name server, as shown in the example of FIG. 2a. The first part of the link is usually presented in the first form, such as text form, and it is converted to the second form, such as numerical form, to include the physical parameters of the network in question. In this description, it is assumed that the first form is the text form and the second form is the form of Internet protocol version 6 (IPv6), but the invention is not limited solely to these embodiments. FIG. 2a shows a method for converting the information of the first part of the link from the first form to the second form by using the service information contained in the default value data source.

The first part of the link is composed of text fields separated from each other by separators. In this example, three types of separators are used. The first field gives the protocol used, such as HTTP, DSMCC, DVB, etc. The name of the protocol is separated from the following field by a protocol separator (://). The name field contains the text fields which are separated from each other with a field separator (.). The first field describes the name of the service, the second field describes the name of the service provider, and the third field describes the name of the network. The name fields are followed by a name separator (/) separating the first part from the second part of the link. In the SDT table, the above-mentioned fields do not necessarily come one after the other, but they can be positioned at different locations in the program-specific record.

According to the method of the first embodiment of the invention, conversion of the first part of the link is conducted as follows: The STB device forms a data transmission connection e.g. to the default value data network, such as cable network 8, or to another data network 25, e.g. through a modem 23 via a landline telecommunication network 24 to the Internet data network. The STB device can also be in connection with a satellite 16a, 16b, wherein the data transmission connection can be made via the satellite to the default value data network. The selected network 25 incorporates at least one name server 22a, 22b, 22c which is in data transmission connection with the network 25. The name server 22a, 22b is for example the mainframe or the like of a company supplying cable network services. The name server 22a, 22b is advantageously in data transmission connection with other computers connected to the network 25 as well as with other networks, wherein data can be transmitted between different networks.

The name server 22a, 22b has advantageously a service file containing information corresponding to that in the SI file. The service information file contains information on services and their providers. The name of the desired services is found in a table of the service information file, wherein the data source is identified, the name of the service provider contained in the table is compared with the text field in the first field of the link, where the name of the service provider is presented. If the data are identical, a search is made in the network information table NIT or the like for information on the network to be used for data transmission. The name of the network is given in the text field of the first part of the link, wherein this information can be utilized in the search. The network information table gives the physical parameters of the data transmission channel to be used for data transmission, wherein the address of the link can be converted to the second form on the basis of the searched information.

The address is returned in the second form to the STB device, wherein it separates the physical parameters of the data transmission channel given in the address, wherein the STB device can start receiving the desired broadcasting. The STB device can also generate control signals ctrl (FIG. 9a) for directing the receiving antenna and adjusting polarization e.g. in a satellite antenna. This is advantageous for example in situations in which it is possible to follow signals from several satellites, wherein the viewer does not need to adjust the satellite antenna manually.

If the service searched for is not found in the name server 22a, 22b in question, the name server 22a, 22b can transfer a request to another name server in the network or to a name server connected to another network, until the information on the service is found.

According to the method of the second embodiment of the invention, conversion of the first part of the link is conducted in the following way. The difference in this embodiment lies primarily in that the STB device makes a search for the SI information advantageously transmitted in the form of SDT tables in the data transmission streams received by the STB device, to find out if the information on the desired service can be found in the memory of the STB device. The search can be made on the same principle, i.e. by comparing the content of the name fields of the SDT tables with the name of the given service. If the name of the service is found, the information on the SDT table can be used for producing the address in the second form, to advantageously comprise the physical parameters of the data transmission channel.

In the third advantageous embodiment of the invention, the methods of the first and second embodiments are combined in a way that the STB device first examines the search information stored in it to find out the data transmission channel. If the information on the desired program is not found in the STB device, a data transmission connection is formed to the name server 22a, 22b, and the next steps are the same as those described in connection with the method according to the first embodiment of the invention.

In a corresponding manner, the fourth advantageous embodiment of the invention combines the methods according to the first and second embodiment in a way that a data transmission connection is formed to the name server 22a, 22b, and for finding out the data transmission channel, the next steps are the same as those described above in connection with the method according to the first embodiment of the invention. If the information on the desired program is not found in the STB device, the STB device will then make a search in the search information stored in it, as described above in connection with the second embodiment of the invention.

In the second form used for the address, it is advantageous to use the link local use address form defined in the standard of Internet Protocol Version 6 (IPv6). This structure is given in Table 1. The address comprises a 10-bit link local prefix having the binary value 1111 1110 11. The following 27 bits are set in this example to be zero, wherein 91 bits are reserved for the parameters of the data transmission channel. The structure of the parameter field varies with different types of data transmission channels. Table 2 shows as an example parameters of a cable television network, and Table 3 shows parameters of a satellite channel. In Tables 2 and 3, the first column gives the name of the field, the second column gives the number of bits reserved for the field, the third column gives the defined values for an example channel, and the fourth column gives the defined values in binary digit form.

TABLE 1

| field name | length in bits | binary value |
|---|---|---|
| Link local use | 10 | 1111 1110 11 |
| filler field | 27 | 0000 0000 0000 0000 0000 0000 000 |
| parameters of data transmission field | 91 | (cf. Tables 2 and 3) |

TABLE 2

| field name | length in bits | value | binary value |
|---|---|---|---|
| channel type | 3 | cable | 001 |
| carrier frequency | 32 | 312.0000 MHz | 0000 0011 0010 0000 0000 0000 0000 0000 |
| reserved | 12 | | 1111 1111 1111 |
| FEC outer code | 4 | not in use | 0001 |
| modulation method | 8 | 64-QAM | 0000 0011 |
| symbol rate | 28 | 27.4500 | 0000 0010 0111 0100 0101 0000 0000 |
| FEC innter code | 4 | ¾ conv. code rate | 0011 |
| Total | 128 | | |

TABLE 3

| field name | length in bits | value | binary value |
|---|---|---|---|
| channel type | 3 | satellite | 010 |
| carrier frequency | 32 | 11.75725 MHz | 0000 0001 0001 0111 0101 0111 0010 0101 |
| satellite location | 16 | 19.2 degrees | 0000 0001 1001 0010 |
| East/West (1/0) | 1 | East | 1 |
| polarization | 2 | circle, counter-clockwise | 10 |
| modulation method | 5 | QPSK | 0 0001 |
| symbol rate | 28 | 27.4500 | 0000 0010 0111 0100 0101 0000 0000 |
| FEC innter code | 4 | ¾ conv. code rate | 0011 |
| Total | 128 | | |

By combining the binary values of Table 1 and 2, the following numerical presentation is obtained in binary form:
1111 1110 1100 0000 0000 0000 0000 0000 0000 0001 0000 0011 0010 0000 0000 0000 0000 0000 1111 1111 1111 0001 0000 0011 0000 0010 0111 0100 0101 0000 0000 0011.

This can be presented as hexadecimal fractions, grouped in four digits:

Combinations of the binary values of Tables 1 and 3 in a corresponding manner gives the following numerical presentation in binary form:
1111 1110 1100 0000 0000 0000 0000 0000 0000 0010 0000 0001 0001 0111 0101 0111 0010 0101 0000 0001 1001 0010 1100 0001 0000 0010 0111 1010 0101 0000 0000 0011.

This can be presented as hexadecimal fractions, grouped in four digits: FEC0:0000:0202:1757:2501:92C1:0274:5003.

Figure 9A:
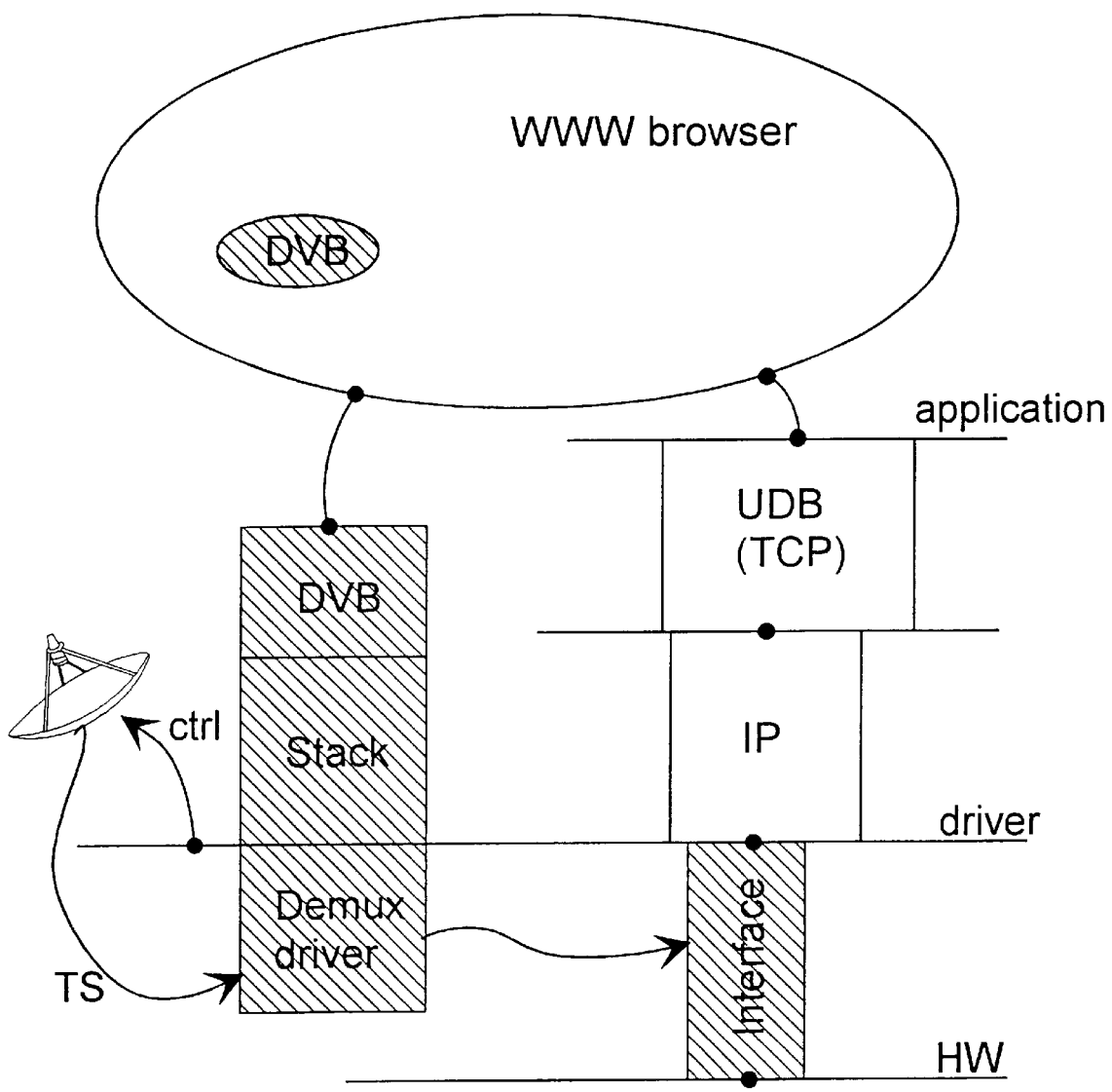
FIGS. 9a and 9b are block diagrams illustrating the search of different types of services with an STB device.
Figure 9B:
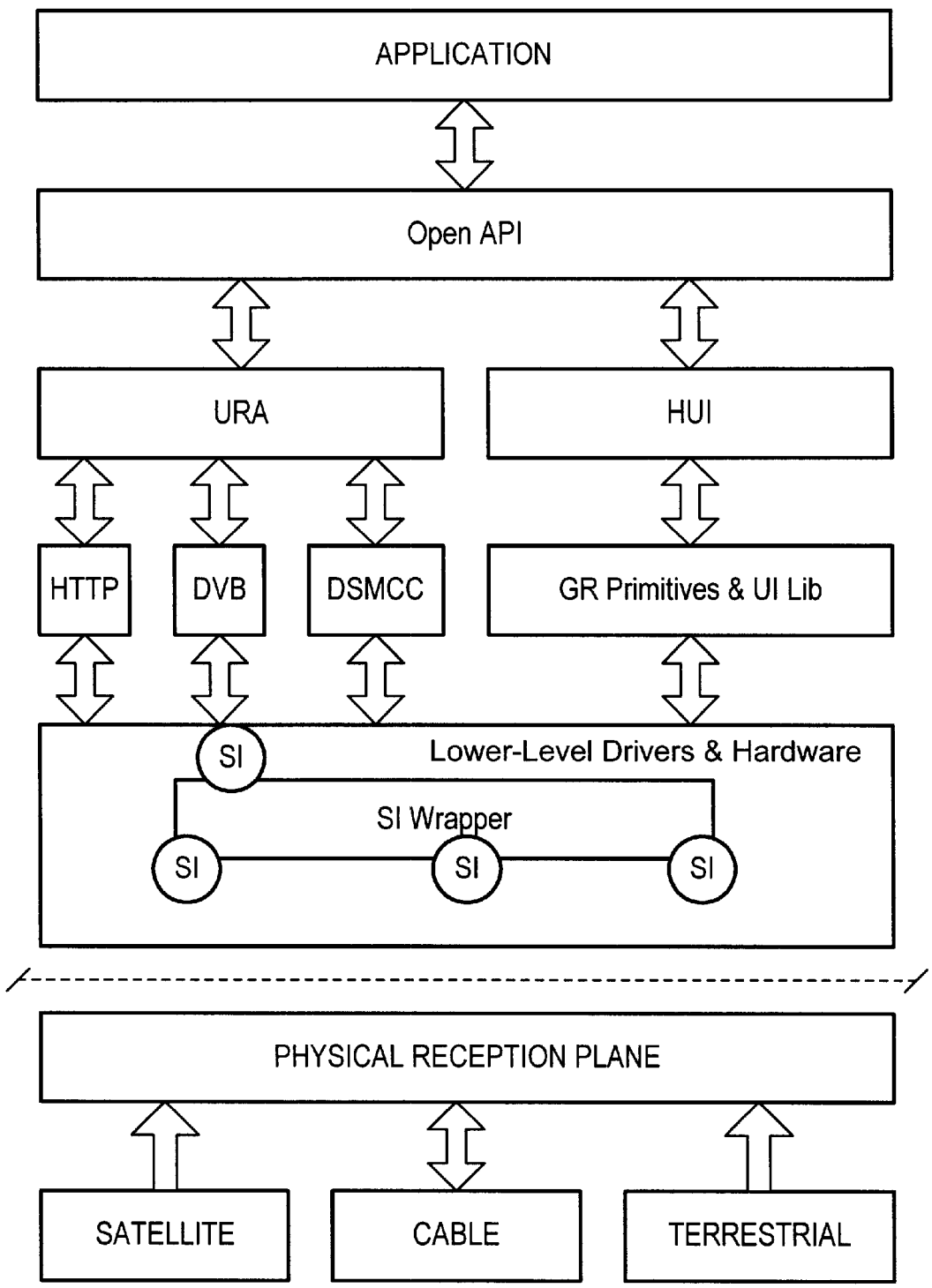

FIGS. 9a and 9b illustrate browsing and search of services to be conducted with the STB device in hierarchic block chart. On the application level, any known browsing program can be used, such as a WWW browser. Changes are required in the WWW browser only in the protocol converter for implementing the interface of the protocol (e.g. HTTP, DVB, DSMCC) between the application and the protocol stack (TCP/IP). Further changes are required only in the driver/hardware interface. In other blocks of FIGS. 9a and 9b, it is possible to use existing software. The change points are marked as ruled areas in FIG. 9a.

FIG. 9b also shows an alternative implementation for the TCP/IP protocol, whereby the protocol stack is rearranged according to the protocol used, such as DVB. Also in this situation, the actual application program does not require any changes other than the changes in the protocol converter. Thus the user interface can remain unchanged, which makes it easier to use the application software particularly in a situation where the user is similar with the user interface in another context, such as the Internet.

The present invention is not limited solely to the above-mentioned embodiments, but it can be changed within the scope of the appended claims.

What is claimed is:

1. A method for discovering address information of a data source in a data transmission system, wherein the data transmission system includes,:

at least one data transmission stream (TS) for transmitting information on at least one data source in a plurality of packets, wherein the packets contain information regarding which data source they belong to, one or more data transmission channels, in which the data transmission streams are conveyed, a name server system for storage of address information of data sources, the address information containing an identification of the data source, and information on the data transmission channel to be used for transmission of the data source, and a data receiving device (19) characterized in that the method for discovering address information of a data source in a data transmission system comprises the steps of:

forming a data transmission connection from the data receiving device (19) to the name server system (22a, 22b, 22c), sending the identification of the data source in a first form to the name server system (22a, 22b, 22c), comparing the identification of the data source received through the transmission with the identification of the data source to be searched for in the same server system, converting the address information to a second form that includes information regarding the transmission channel data to be used for data transmission of the data source when the identification of the data source searched for is found in the address information, and returning the address information in the second form to the data receiving device (19).

2. A method according to claim 1, characterized in that the search for the address information is conducted in stages, wherein:

at the first stage, a data transmission connection is formed from the data receiving device (19) to the name server system (22a, 22b, 22c) and the identification of the data source is sent to the name server system (22a, 22b, 22c), the identification of the data source is compared in the name server system (22a, 22b, 22c) with the identification of the data source to be searched for, wherein when the identification of the data source searched for is found in the address information, the address information is converted to the second form to advantageously comprise information on the transmission channel to be used for data transmission of the data source, and the address information is returned in the second form to the data receiving device (19), and if the address information searched for was not found at the first stage, a second stage is conducted, at which in at least one data transmission stream (TS) received by the data receiving device (19), a comparison is made between the identification of the data source and the identification of the data source to be searched for, wherein when the identification of the data source searched for is found in the address information, the address information is converted to the second form to advantageously comprise information on the transmission channel to be used for data transmission of the data source.

3. A method according to claim 1, characterized in that the search for the address information is conducted in stages, wherein:

at the first stage, in at least one data transmission stream (TS) received by the data receiving device (19), a comparison is made between the identification of the data source and the identification of the data source to be searched for, wherein when the identification of the data source searched for is found in the address information, the address information is converted to the second form to advantageously comprise information on the transmission channel to be used for data transmission of the data source, and if the address information searched for was not found at the first stage, a second stage is conducted, at which a data transmission connection is formed from the data receiving device (19) to the name server system (22*a*, 22*b*, 22*c*) and the identification of the data source is sent to the name server system (22*a*, 22*b*, 22*c*), the identification of the data source is compared in the name server system (22*a*, 22*b*, 22*c*) with the identification of the data source to be searched for, wherein when the identification of the data source searched for is found in the address information, the address information is converted to the second form to advantageously comprise information on the transmission channel to be used for data transmission of the data source, and the address information is returned in the second form to the data receiving device (19).

4. A method according to claim 1, characterized in that the first form is a text form and the second form is a numerical form.

5. A method according to claim 1, characterized in that the data transmission channel comprises a satellite (16*a*, 16*b*).

6. A method according to claim 1, characterized in that the data transmission channel comprises a cable network (18).

7. A method according to claim 1, characterized in that the data transmission connection from the data receiving device (19) to the name server system (22*a*, 22*b*, 22*c*) is formed via the Internet data network (25).

8. A method for discovering address information of a data source in a data transmission system, wherein the data transmission system includes, at least one data transmission stream (TS) for transmitting information on at least one data source in a plurality of packets, wherein the packets contain information regarding which data source they belong to, one or more data transmission channels, in which the data transmission streams are conveyed, and a data receiving device (19), which method is used for transmitting in at least one data transmission stream (TS) the address information in a first form of at least one data source belonging to the data transmission system, the address information comprising the identification of the data source, and information on the data transmission channel to be used for data transmission of the data source, characterized in that the method for discovering address information of a data source in a data transmission system comprises the steps of:

for at least one data transmission stream (TS) received by the data receiving device (19), comparing the identification of the data source received through the transmission with the identification of the data source to be searched for in the data receiving device, and converting the address information to a second form to include information on the transmission channel to be used for data transmission of the data source when the identification of the data source searched for is found in the address information.

9. A method according to claim 8, characterized in that the search for the address information is conducted in stages, wherein:

at the first stage, a data transmission connection is formed from a data receiving device (19) to a name server system (22*a*, 22*b*, 22*c*) and the identification of the data source is sent to the name server system (22*a*, 22*b*, 22*c*), the identification of the data source is compared in the name server system (22*a*, 22*b*, 22*c*) with the identification of the data source to be searched for, wherein when the identification of the data source searched for is found in the address information, the address is converted to a second form to advantageously comprise information on the transmission channel to be used for data transmission of the data source, and the address information is returned in the second form to the data receiving device (19), and if the address information searched for was not found at the first stage, a second stage is conducted, at which in at least one data transmission stream (TS) received by the data receiving device (19), a comparison is made between the identification of the data source and the identification of the data source to be searched for, wherein when the identification of the data source searched for is found in the address information, the address is converted to the second form to advantageously comprise information on the transmission channel to be used for data transmission of the data source.

10. A method according to claim 8, characterized in that the search for the address information is conducted in stages, wherein:

at the first stage, in at least one data transmission stream (TS) received by the data receiving device (19), a comparison is made between the identification of the data source and the identification of the data source to be searched for, wherein when the identification of the data source searched for is found in the address information, the address is converted to the second form to advantageously comprise information on the transmission channel to be used for data transmission of the data source, and if the address information searched for was not found at the first stage, the second stage is conducted, at which a data transmission connection is formed from the data receiving device (19) to the name server system (22*a*, 22*b*, 22*c*) and the identification of the data source is sent to the name server system (22*a*, 22*b*, 22*c*), the identification of the data source is compared in the name server system (22*a*, 22*b*, 22*c*) with the identification of the data source to be searched for, wherein when the identification of the data source searched for is found in the address information, the address is converted to the second form to advantageously comprise information on the transmission channel to be used for data transmission of the data source, and the address is returned in the second form to the data receiving device (19).

11. A method according to claim 8, characterized in that the first address form is a text form and the second address form is a numerical form.

12. A method according to claim 11, characterized in that the text form is a character string complying to the DVB naming practice and the numerical form is in the form of the Internet Protocol Version 6 (IPv6).

13. A method according to claim 8, characterized in that the data transmission channel comprises a satellite (16*a*, 16*b*).

14. A method according to claim 8, characterized in that the data transmission channel comprises a cable network (18).

15. A method according to claim 9, characterized in that the data transmission connection from the data receiving device (19) to the name server system (22a, 22b, 22c) is formed via the Internet data network (25).

16. A data transmission system comprising:

means (14a, 14b) for forming at least one data transmission stream (TS) for transmitting information on at least one data source (A, B, C, D, E) in a plurality of packets, wherein the packets incorporate information on which data sources (A, B, C, D, E) they belong to, one or several data transmission channels (16a, 16b, 18) in which data transmission streams (TS) are arranged to be carried, a name server system comprising at least one name server (22a, 22b, 22c), in which address information of data sources is stored, the address information comprising the identification of the data source, and information on the data transmission channel to be used for transmission of the data source, and a data receiving device (19), characterized in that a data transmission connection is arranged to be formed from the data receiving device (19) to the name server system (22a, 22b, 22c) for sending the identification of a desired data source in a first form to the name server system (22a, 22b, 22c), in which the identification of the data source received through the transmission is arranged to be compared with the identification of the data source to be searched for in the same server system, wherein when the identification of the data source searched for is found in the address information of the data source, the address is converted to a second form to advantageously comprise information on the transmission channel to be used for data transmission of the data source, and the address is arranged to be returned in the second form to the data receiving device (19).

17. A data transmission system comprising:

means (14a, 14b) for forming at least one data transmission stream (TS) for transmitting information on at least one data source (A, B, C, D, E) a plurality of packets, wherein the packets are arranged to incorporate information on which data source (A, B, C, D, E) they belong to, one or several data transmission channels (16a, 16b, 18), in which data transmission streams (TS) are arranged to be carried, a name server system comprising at least one name server (22a, 22b, 22c), in which address information of data sources is stored, the address information comprising an identification of the data source, and information on the data transmission channel to be used for transmission of the data source, and a data receiving device (19), in which system the address information of at least one data source belonging to the data transmission system is arranged to be transmitted in at least one data transmission stream (TS) in a first form, the address information comprising the identification of the data source received through the transmission, and information on the data transmission channel to be used for transmission of the data source, characterized in that the system comprises means (19) for comparing the identification of the data source in thew same server system with the identification of the data source in at least one data transmission stream (TS) received, wherein when the identification of the data source is found in the address information, the address information is arranged to be converted to a second form on the basis of the address information corresponding to the identification, the address information advantageously comprising information on the data transmission channel to be used for transmission of the data source.

* * * * *

UNITED STATES PATENT AND TRADEMARK OFFICE
CERTIFICATE OF CORRECTION

PATENT NO. : 6,314,111 B1
DATED : November 6, 2001
INVENTOR(S) : M. Nandikonda et al.

It is certified that error appears in the above-identified patent and that said Letters Patent is hereby corrected as shown below:

Title page,
Item [57], ABSTRACT,
Last line, "date" should be -- data --.

Column 14,
Line 24, before "transmission" -- data -- should be inserted.
Line 25, (second occurance) "data" should be deleted.

Column 16,
Line 1, "the" should be -- a --.
Line 2, "a" before "data" should be -- the --.
Line 56, both instances of "address" should be deleted.

Column 17,
Line 30, "same" should be -- name --.

Column 18,
Line 4, before "a" -- in -- should be inserted.
Lines 22 and 23, "received through the transmission" should be deleted.
Line 26, "thew same" should be -- the name --.

Signed and Sealed this

Nineteenth Day of November, 2002

*Attest:*

JAMES E. ROGAN
*Attesting Officer*   *Director of the United States Patent and Trademark Office*